(12) United States Patent
Vazny et al.

(10) Patent No.: US 12,108,496 B2
(45) Date of Patent: Oct. 1, 2024

(54) RF RADIOHEAD WITH OPTICAL INTERCONNECTION TO BASEBAND PROCESSOR

(71) Applicant: Apple Inc., Cupertino, CA (US)

(72) Inventors: Rastislav Vazny, Sunnyvale, CA (US); Matthias Sauer, Campbell, CA (US); Ronald W. Dimpflmaier, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/723,071

(22) Filed: Apr. 18, 2022

(65) Prior Publication Data

US 2022/0256649 A1    Aug. 11, 2022

Related U.S. Application Data

(63) Continuation of application No. 15/716,730, filed on Sep. 27, 2017, now Pat. No. 11,310,869.

(51) Int. Cl.
| | |
|---|---|
| *H04W 88/08* | (2009.01) |
| *H04B 1/40* | (2015.01) |
| *H04M 1/00* | (2006.01) |
| *H04W 40/06* | (2009.01) |

(52) U.S. Cl.
CPC ............ *H04W 88/085* (2013.01); *H04B 1/40* (2013.01); *H04M 1/003* (2013.01); *H04W 40/06* (2013.01)

(58) Field of Classification Search
CPC ...... H04W 88/085; H04W 40/06; H04B 1/40; H04M 1/003
See application file for complete search history.

(56) References Cited

U.S. PATENT DOCUMENTS

| | | | |
|---|---|---|---|
| 5,469,176 A | * | 11/1995 | Sandler .................. H01Q 1/04 |
| | | | 342/81 |
| 7,873,385 B2 | | 1/2011 | Boireau et al. |
| 8,224,240 B2 | | 7/2012 | Li et al. |
| 8,948,254 B2 | | 2/2015 | Nakajima et al. |
| 9,419,750 B2 | | 8/2016 | Roh et al. |
| 9,472,956 B2 | | 10/2016 | Michaelis et al. |
| 9,485,063 B2 | | 11/2016 | Shattil |
| 9,485,697 B1 | | 11/2016 | Wang et al. |
| 9,642,089 B2 | | 5/2017 | Sharma et al. |
| 10,020,887 B2 | * | 7/2018 | Masunaga ........ H04B 10/25753 |
| 2013/0142054 A1 | | 6/2013 | Ahmadi |
| 2013/0182691 A1 | | 7/2013 | Chmeil et al. |
| 2015/0087248 A1 | * | 3/2015 | Yehezkely ............... H04B 1/40 |
| | | | 455/84 |

(Continued)

OTHER PUBLICATIONS

Optical Networking Best Practices Handbook, Vacca, Nov. 2006, Wiley-Interscience, pp. 1-9 (Year: 2006).*

*Primary Examiner* — Linda Wong
(74) *Attorney, Agent, or Firm* — FLETCHER YODER PC (57) ABSTRACT

A portable electronic device includes a baseband integrated circuit configured to generate communication data and control signals. The portable electronic device also includes an optical path configured to be coupled to the baseband integrated circuit to transmit the data signals from the baseband integrated circuit. The portable electronic device additionally includes a radiohead configured to be coupled to the optical path to receive the data signals transmitted along the optical path from the baseband integrated circuit.

20 Claims, 6 Drawing Sheets

(56) References Cited

U.S. PATENT DOCUMENTS

| | | |
|---|---|---|
| 2015/0207534 A1* | 7/2015 | Rada .................. H04B 1/10 |
| | | 329/319 |
| 2016/0127027 A1 | 5/2016 | Ling et al. |
| 2016/0150591 A1 | 5/2016 | Tarighat Mehrabani et al. |
| 2016/0218801 A1 | 7/2016 | Chung et al. |
| 2016/0329631 A1 | 11/2016 | Rheinfelder et al. |
| 2016/0380664 A1 | 12/2016 | Braun et al. |
| 2017/0279541 A1* | 9/2017 | Prendergast ......... H04B 10/801 |
| 2018/0106904 A1* | 4/2018 | Zou .......................... G01S 7/03 |
| 2018/0172407 A1* | 6/2018 | Cohen .................... F41H 11/02 |
| 2018/0329052 A1* | 11/2018 | Gallagher ............ H01Q 1/3216 |
| 2019/0365294 A1* | 12/2019 | Poeze ...................... A61B 5/70 |
| 2021/0021914 A1* | 1/2021 | Perlmutter ............. H04B 10/61 |
| 2022/0201600 A1* | 6/2022 | Reshef ................. H04B 1/0003 |

* cited by examiner

RF RADIOHEAD WITH OPTICAL INTERCONNECTION TO BASEBAND PROCESSOR

CROSS REFERENCE TO RELATED APPLICATIONS

This application is a continuation of and claims priority to U.S. application Ser. No. 15/716,730, filed Sep. 27, 2017, entitled, "RF RADIOHEAD WITH OPTICAL INTERCONNECTION TO BASEBAND PROCESSOR," the disclosure of which is incorporated by reference in its entirety for all purposes.

BACKGROUND

The present disclosure relates generally to use of transmitters in electronic devices.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Wireless communication devices (e.g., smartphones, wearable devices, etc.) are proliferating. Many wireless communication devices support multiple communication protocols on the same platform. For example, wireless communication devices may use Long-Term Evolution (LTE), Wideband Code Division Multiple Access (WCDMA), wireless local area networks (WLAN), Bluetooth, Global Positioning System (GPS), Near-Field Communication (NFC), and/or other suitable wireless communication protocols in addition to cellular/connectivity transceivers, such as radio frequency transceivers. Typically, radio frequency transceivers are located close to the cellular/connectivity baseband integrated circuits to avoid long routing lines between the transceivers and the baseband integrated circuits. However, the close proximity of the radio frequency transceiver to the baseband integrated circuit can lead to long RF routing lines across a device to one or more antenna(s) of the device (e.g., which are typically located at the opposite sides of the device) and, therefore, causes performance degradation (e.g., receive sensitivity degradation and/or increased current drain) and increased device cost (e.g., due to wiring complexities).

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In some embodiments, selective positioning of one or more radio frequency transceivers in a user device is undertaken. For example, placement of the one or more radio frequency transceivers may be adjacent or directly adjacent to one or more antennas of the device. As result, radio frequency performance impact (e.g., degradation) is reduced and/or minimized. Additionally, a single path may be utilized between any radio frequency transceiver and the baseband integrated circuit. In some embodiments, an optical path (e.g., a fiber optic or other optical path) may be utilized. In some embodiments, an optical connection (e.g., interface) may also be utilized at one or more of the radio frequency transceiver and the baseband integrated circuit. Use of the optical path may operate to reduce both interference to and from additional subsystems of the device. Additionally, the optical path may have sufficient bandwidth so that one optical interconnection between the radio frequency transceiver and the baseband integrated circuit is utilized. Moreover, the number of the interconnections between the radio frequency transceiver and the baseband integrated circuit can be reduced with accompanying gains in both reduced complexity and cost related to the interconnections.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Typically a cellular/connectivity radio frequency transceiver is located close to the cellular/connectivity baseband integrated circuit (IC) to avoid long routing lines between the IC and the transceiver. In general, the routing lines include multiple metal wires, and may produce electromagnetic interference. However, when the radio frequency transceiver is located close to the cellular/connectivity baseband IC, transmission lines must travel the remaining distance to the antennas (which are typically located at the opposite sides of the device). These relatively long transmission lines may cause performance issues such as increased current drain and reception sensitivity degradation.

Accordingly, placement of the radio frequency transceiver in close proximity to the device antennas may instead be undertaken. As result, the radio frequency (RF) performance degradation may be reduced. An optical interconnection to the respective transceivers (each located proximate to a respective antenna) and the baseband IC may be used to reduce electromagnetic interference to other devices and subsystems. Similarly the sensitivity to interference coupling from other device subsystems is minimized through the use of optical fiber wire between the respective RF transceivers (each located proximate to a respective antenna) and the baseband IC.

Figure 1:
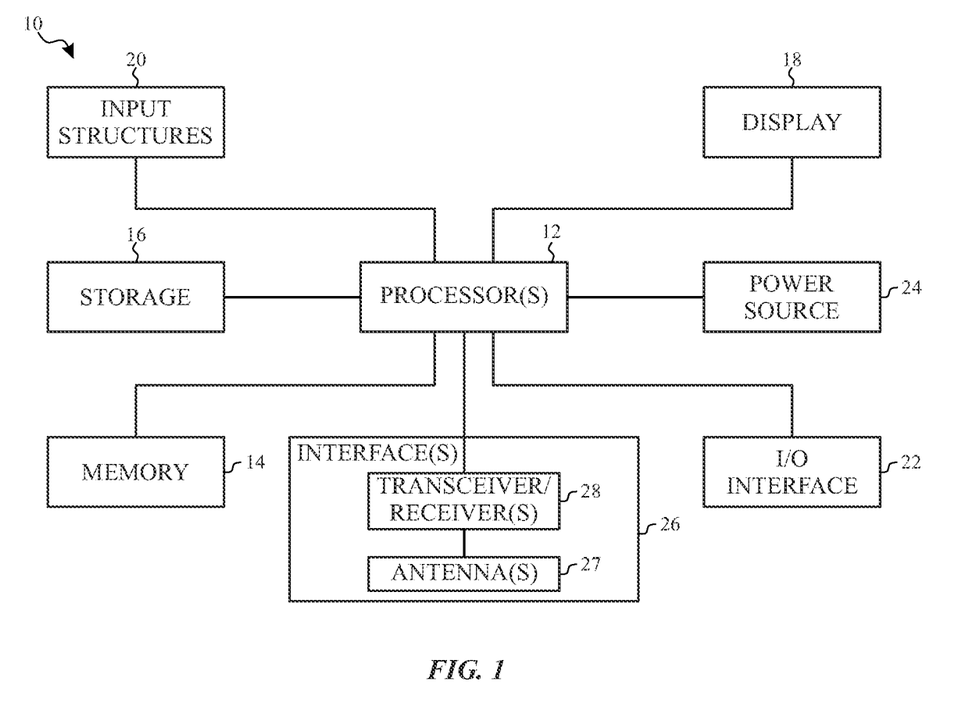
FIG. 1 is a schematic block diagram of an electronic device including wireless transceiver(s)/receiver(s), in accordance with an embodiment.

With the foregoing in mind and referring first to FIG. 1, an electronic device 10 according to an embodiment of the present disclosure may include, among other things, one or more processor(s) 12, memory 14, nonvolatile storage 16, a display 18, input structures 20, an input/output (I/O) interface 22, a power source 24, and network interface(s) 26. The various functional blocks shown in FIG. 1 may include hardware elements (e.g., including circuitry), software elements (e.g., including computer code stored on a computer-readable medium) or a combination of both hardware and software elements. It should be noted that FIG. 1 is merely one example of a particular implementation and is intended to illustrate the types of components that may be present in electronic device 10.

In the electronic device 10 of FIG. 1, the processor(s) 12 and/or other data processing circuitry may be operably coupled with the memory 14 and the nonvolatile storage 16 to perform various algorithms. Such programs or instructions, including those for executing the techniques described herein, executed by the processor(s) 12 may be stored in any suitable article of manufacture that includes one or more tangible, computer-readable media at least collectively storing the instructions or routines, such as the memory 14 and the nonvolatile storage 16. The memory 14 and the nonvolatile storage 16 may include any suitable articles of manufacture for storing data and executable instructions, such as random-access memory, read-only memory, rewritable flash memory, hard drives, and/or optical discs. Also, programs (e.g., an operating system) encoded on such a computer program product may also include instructions that may be executed by the processor(s) 12 to enable the electronic device 10 to provide various functionalities.

In certain embodiments, the display 18 may be a liquid crystal display (e.g., LCD), which may allow users to view images generated on the electronic device 10. In some embodiments, the display 18 may include a touch screen, which may allow users to interact with a user interface of the electronic device 10. Furthermore, it should be appreciated that, in some embodiments, the display 18 may include one or more light emitting diode (e.g., LED) displays, or some combination of LCD panels and LED panels.

The input structures 20 of the electronic device 10 may enable a user to interact with the electronic device 10 (e.g., pressing a button to increase or decrease a volume level). The I/O interface 22 may enable the electronic device 10 to interface with various other electronic devices. The I/O interface 22 may include various types of ports that may be connected to cabling. These ports may include standardized and/or proprietary ports, such as USB, RS232, Apple's Lightning® connector, as well as one or more ports for a conducted RF link.

As further illustrated, the electronic device 10 may include a power source 24. The power source 24 may include any suitable source of power, such as a rechargeable lithium polymer (e.g., Li-poly) battery and/or an alternating current (AC) or direct current (DC) power converter/inverter. The power source 24 may also be removable, such as a replaceable battery cell.

The network interface(s) 26 enable the electronic device 10 to connect to one or more network types and one or more other devices. The network interface(s) 26 may also include, for example, interfaces for a personal area network (e.g., PAN), such as a Bluetooth connection, for a local area network (e.g., LAN) or wireless local area network (e.g., WLAN), such as an 802.11x Wi-Fi network or an 802.15.4 network, and/or for a wide area network (e.g., WAN), such as a 3rd generation (e.g., 3G) cellular network, 4th generation (e.g., 4G) cellular network, or long term evolution (e.g., LTE) cellular network. The network interface(s) 26 may also include interfaces for, for example, broadband fixed wireless access networks (e.g., WiMAX), mobile broadband Wireless networks (e.g., mobile WiMAX), and so forth and/or an NFC communication interface. The network interface(s) 26 may also include antenna(s) 27 that detect and/or transmit wireless signals around the electronic device 10 and passes the received signals to/from transceiver/receiver(s) 28. The transceiver/receiver(s) 28 may include one or more receivers and/or transmitters that are configured to send and/or receive information via one or more respective antennas of the antenna(s) 27. Each transceiver/receiver 28 may be connected to its own antenna 27. Alternatively, at least some of the transceiver/receiver(s) 28 may share an antenna 27.

Figure 2:
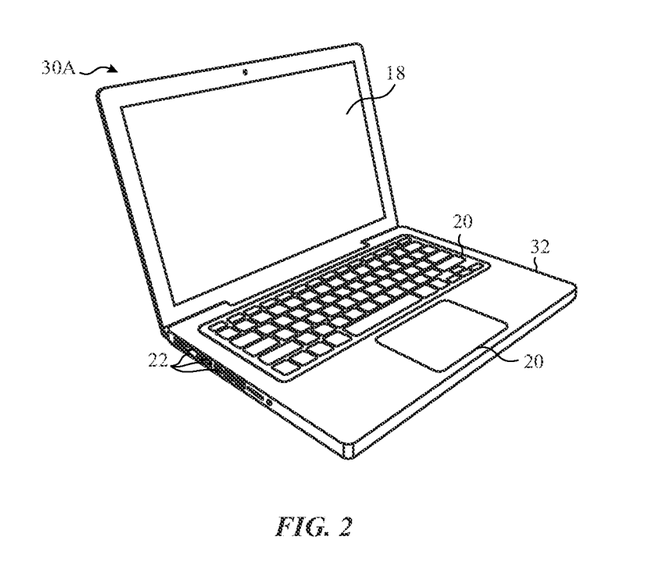
FIG. 2 is a perspective view of a notebook computer representing an embodiment of the electronic device of FIG. 1, in accordance with an embodiment.
Figure 3:
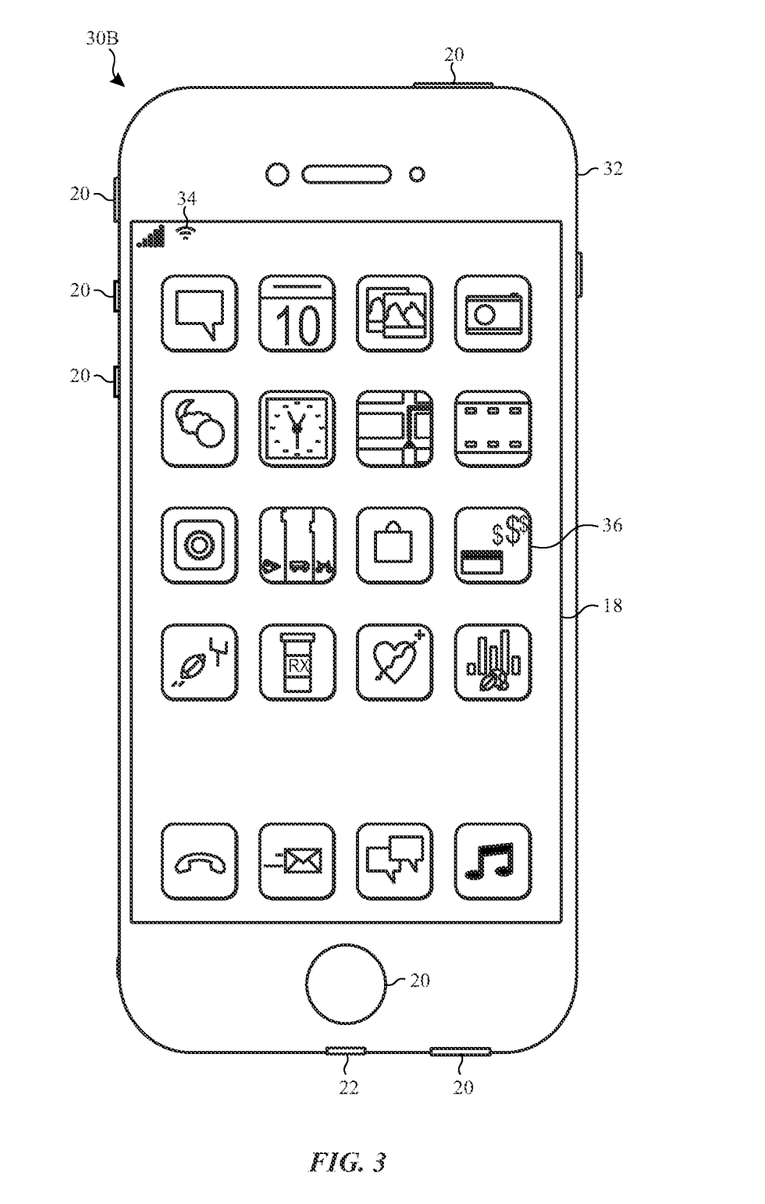
FIG. 3 is a front view of a hand-held device representing another embodiment of the electronic device of FIG. 1, in accordance with an embodiment.
Figure 4:
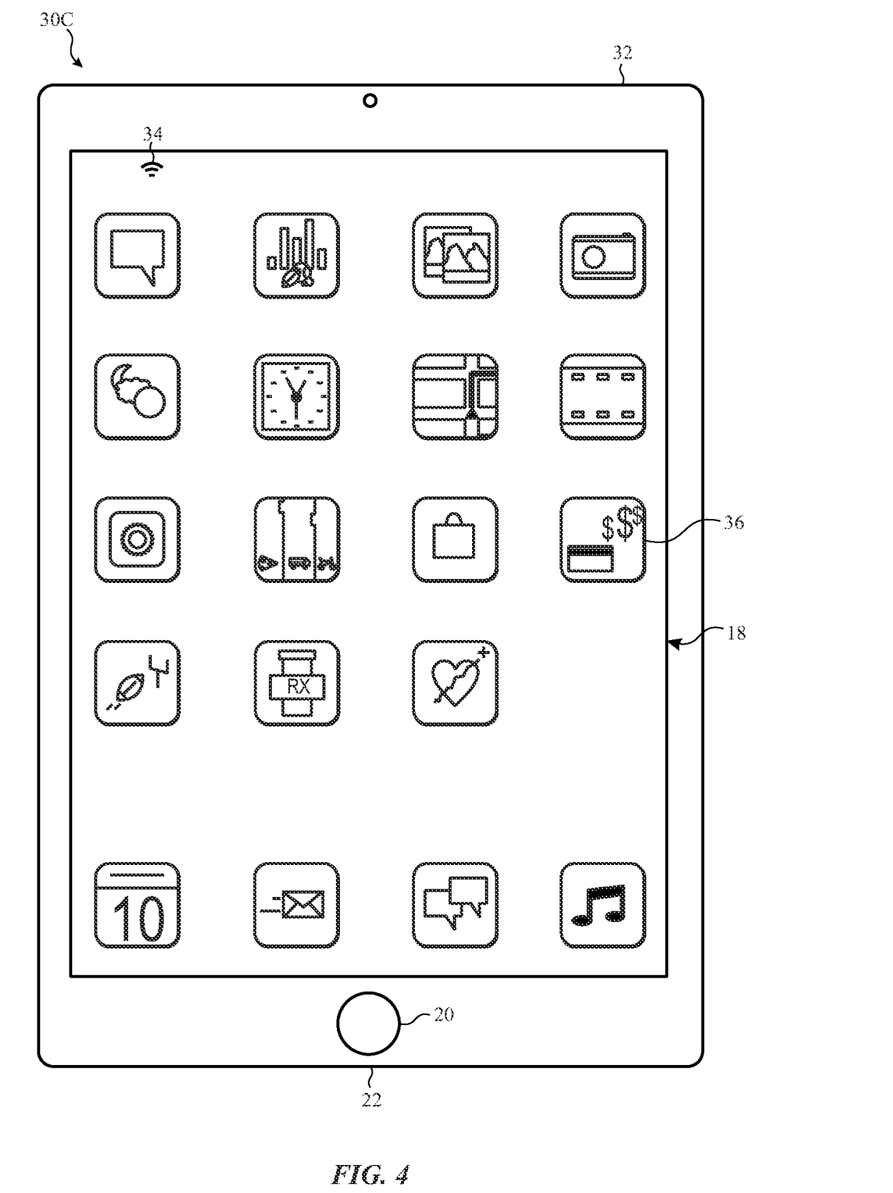
FIG. 4 is a front view of another hand-held device representing another embodiment of the electronic device of FIG. 1, in accordance with an embodiment.
Figure 5:
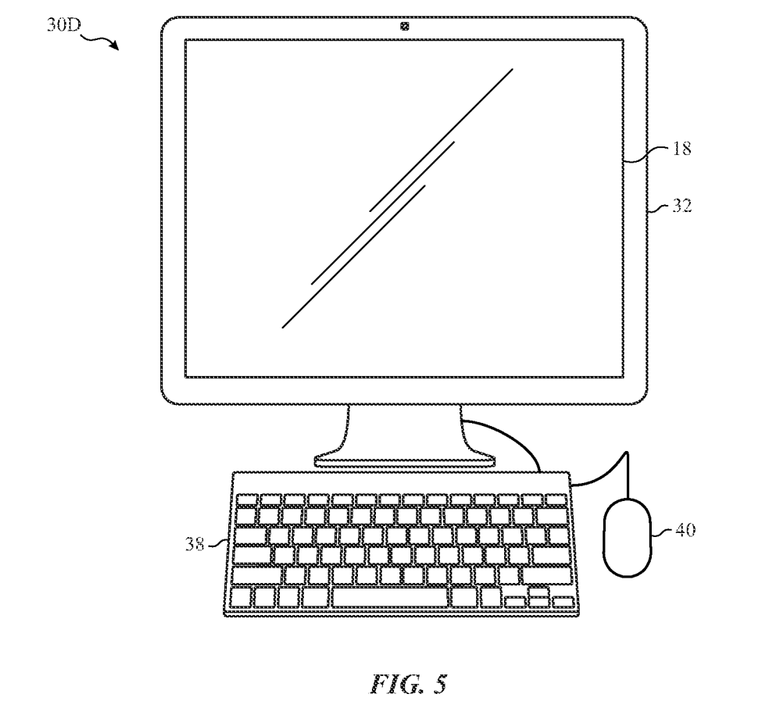
FIG. 5 is a front view of a desktop computer representing another embodiment of the electronic device of FIG. 1, in accordance with an embodiment.
Figure 6:
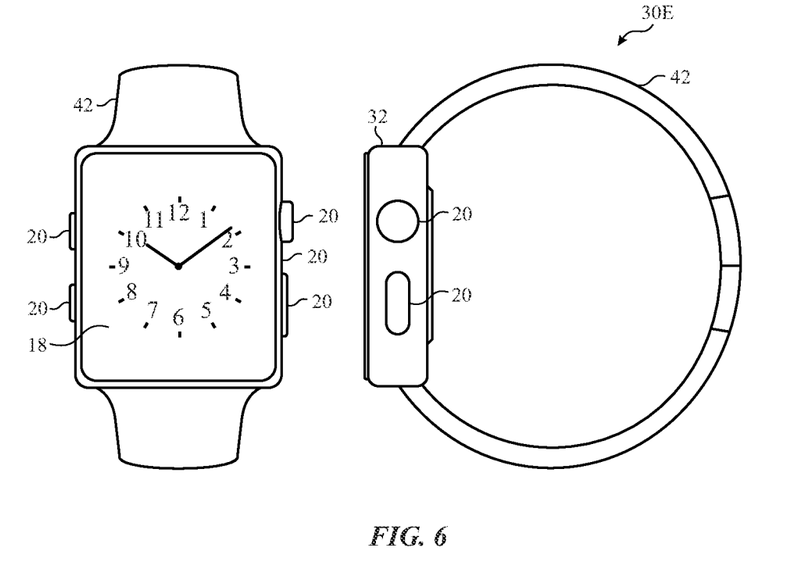
FIG. 6 is a front view of a wearable electronic device representing another embodiment of the electronic device of FIG. 1, in accordance with an embodiment.

By way of example, the electronic device 10 may represent a block diagram of the notebook computer depicted in FIG. 2, the handheld device depicted in either of FIG. 3 or FIG. 4, the desktop computer depicted in FIG. 5, the wearable electronic device depicted in FIG. 6, or similar devices. It should be noted that the processor(s) 12 and/or other data processing circuitry may be generally referred to herein as "data processing circuitry." Such data processing circuitry may be embodied wholly or in part as software, firmware, hardware, or any combination thereof. Furthermore, the data processing circuitry may be a single contained processing module or may be incorporated wholly or partially within any of the other elements within the electronic device 10.

In certain embodiments, the electronic device 10 may take the form of a computer, a portable electronic device, a wearable electronic device, or other type of electronic device. Such computers may include computers that are generally portable (e.g., such as laptop, notebook, and tablet computers) as well as computers that are generally used in one place (e.g., such as conventional desktop computers, workstations and/or servers). In certain embodiments, the electronic device 10 in the form of a computer may be a model of a MacBook®, MacBook® Pro, MacBook Air®, iMac®, Mac® mini, or Mac Pro® available from Apple Inc. By way of example, the electronic device 10, taking the form of a notebook computer 30A, is illustrated in FIG. 2 in accordance with one embodiment of the present disclosure. The depicted computer 30A may include a housing or enclosure 32, a display 18, input structures 20, and ports of the I/O interface 22. In one embodiment, the input structures 20 (e.g., such as a built in keyboard and/or touchpad) may be used to interact with the computer 30A, such as to start, control, or operate a graphical user interface (GUI) or applications running on computer 30A. For example, a keyboard and/or touchpad may allow a user to navigate a user interface or application interface displayed on display 18.

FIG. 3 depicts a front view of a handheld device 30B, which represents one embodiment of the electronic device 10. The handheld device 30B may represent, for example, a portable phone, a media player, a personal data organizer, a handheld game platform, or any combination of such devices. By way of example, the handheld device 30B may be a model of an iPod® or iPhone® available from Apple Inc. of Cupertino, California.

The handheld device 30B may include an enclosure 32 to protect interior components from physical damage and to shield them from electromagnetic interference. The enclosure 32 may surround the display 18, which may display indicator icons 34. The indicator icons 34 may indicate, among other things, a cellular signal strength, Bluetooth connection, and/or battery life. Likewise, the handheld device 30B may include graphical icons 36 that may be part of a GUI, which allow a user to interact with the handheld device 30B. Additionally, the illustrated I/O interface 22 may open through the enclosure 32 and may include, for example, an I/O port for a hard wired connection for charging and/or content manipulation using a connector and protocol, such as the Lightning connector provided by Apple Inc., a universal serial bus (e.g., USB), one or more conducted RF connectors, or other connectors and protocols.

User input structures 20, in combination with the display 18, may allow a user to control the handheld device 30B. For example, one of the input structures 20 may activate or deactivate the handheld device 30B, one of the input structures 20 may navigate user interface to a home screen, a user-configurable application screen, and/or activate a voice-recognition feature of the handheld device 30B, while other of the input structures 20 may provide volume control, or may toggle between vibrate and ring modes. Additional input structures 20 may also include a microphone may obtain a user's voice for various voice-related features, and a speaker to allow for audio playback and/or certain phone capabilities. The input structures 20 may also include a headphone input (not illustrated) to provide a connection to external speakers and/or headphones and/or other output structures.

FIG. 4 depicts a front view of another handheld device 30C, which represents another embodiment of the electronic device 10. The handheld device 30C may represent, for example, a tablet computer, or one of various portable computing devices. By way of example, the handheld device 30C may be a tablet-sized embodiment of the electronic device 10, which may be, for example, a model of an iPad® available from Apple Inc. of Cupertino, California.

Turning to FIG. 5, a computer 30D may represent another embodiment of the electronic device 10 of FIG. 1. The computer 30D may be any computer, such as a desktop computer, a server, or a notebook computer, but may also be a standalone media player or video gaming machine. By way of example, the computer 30D may be an iMac®, a MacBook®, or other similar device by Apple Inc. It should be noted that the computer 30D may also represent a personal computer (e.g., PC) by another manufacturer. A similar enclosure 32 may be provided to protect and enclose internal components of the computer 30D such as the display 18. In certain embodiments, a user of the computer 30D may interact with the computer 30D using various peripheral input devices as the input structures 20, such as the keyboard 38 or mouse 40, which may connect to the computer 30D via an I/O interface 22.

Similarly, FIG. 6 depicts a wearable electronic device 30E representing another embodiment of the electronic device 10 of FIG. 1 that may be configured to operate using the techniques described herein. By way of example, the wearable electronic device 30E, which may include a wristband 42, may be an Apple Watch® by Apple, Inc. However, in other embodiments, the wearable electronic device 30E may include any wearable electronic device such as, for example, a wearable exercise monitoring device (e.g., pedometer, accelerometer, heart rate monitor), or other device by another manufacturer. The display 18 of the wearable electronic device 30E may include a touch screen (e.g., LCD, an organic light emitting diode display (OLED), an active-matrix organic light emitting diode (AMOLED) display, and so forth), which may allow users to interact with a user interface of the wearable electronic device 30E.

The embodiments of FIGS. 2-6 are examples of mobile and stationary electronic devices that may include one or more network interfaces 26 to transmit or receive signals wirelessly. Such wireless communication may use Long-Term Evolution (LTE), Wideband Code Division Multiple Access (WCDMA). Wi-Fi, wireless local area networks (WLAN). Bluetooth. Global Positioning System (GPS). Near-Field Communication (NFC). Radio Frequency Identification (RFID), and/or other suitable wireless communication protocols using one or more transceiver/receiver(s) 28. Further details regarding embodiments of the network interface 26 are described below with respect to FIGS. 7 and 8.

Figure 7:
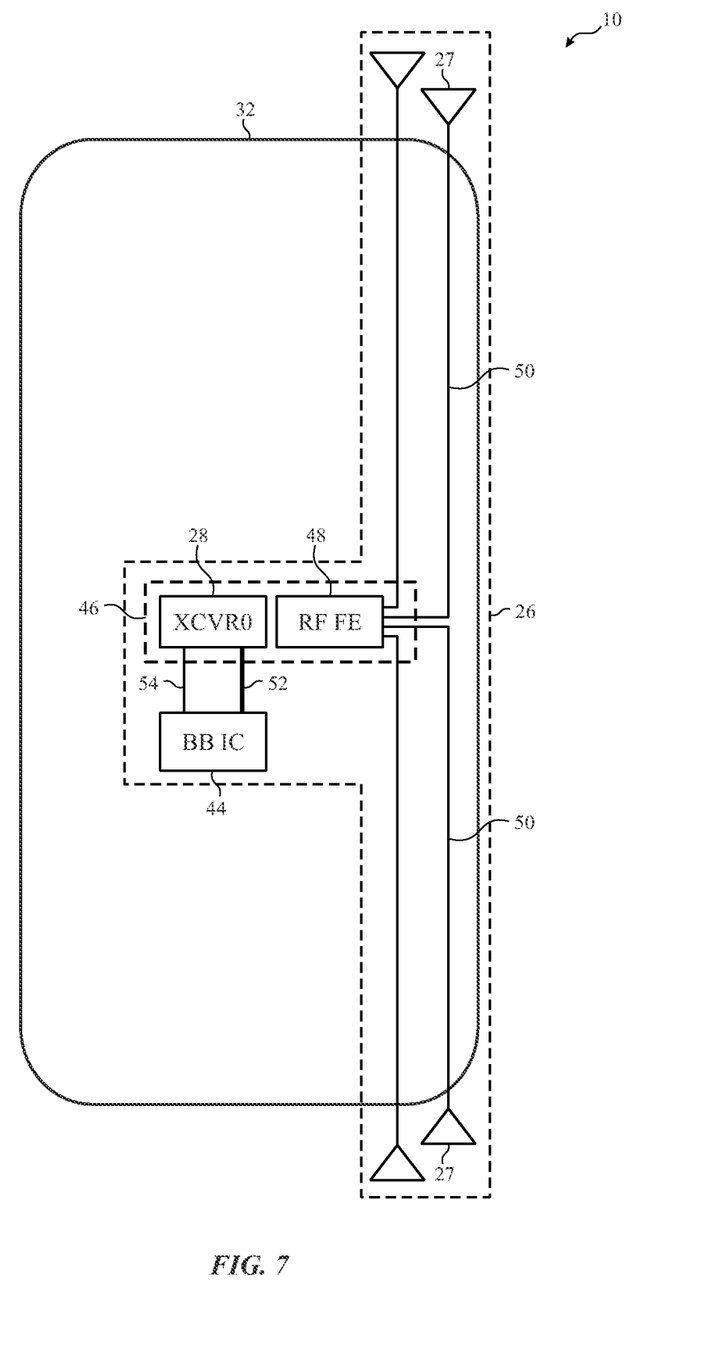
FIG. 7 is a schematic view of an electronic device including a wireless transceiver/receiver with an optical routing line, in accordance with an embodiment.
Figure 8:
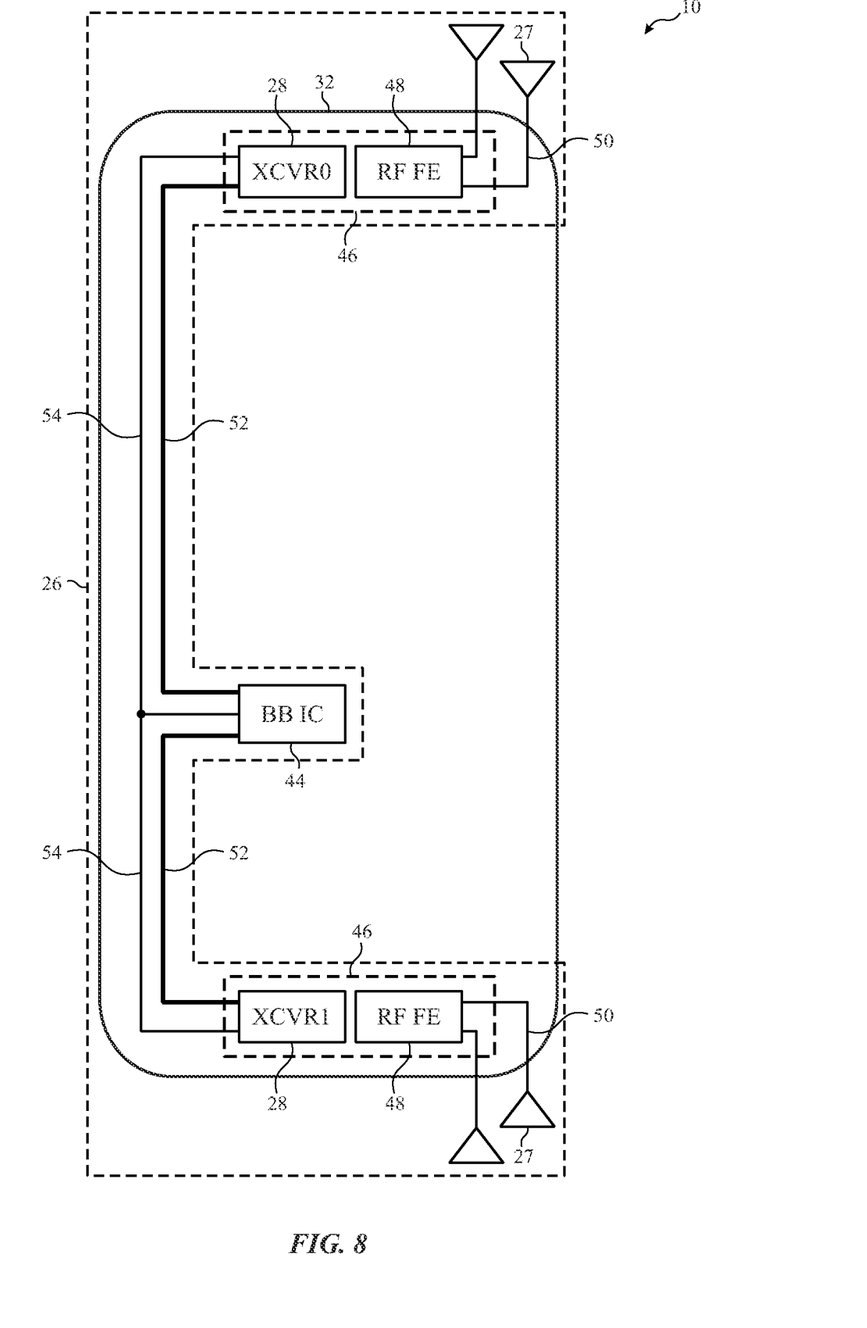
FIG. 8 is a schematic view of an electronic device including multiple wireless transceivers/receivers with optical routing lines, in accordance with an embodiment.

FIG. 7 depicts a general electronic device 10 utilizing a baseband integrated circuit (BBIC) 44 for signal and data processing and a radiohead 46 to transmit and receive wireless signals. The BBIC 44, radiohead 46, antenna(s) 27, or a combination thereof may be included, in whole or in part, as part of the network interface 26 and may be utilized, for example, in RF communications. Additionally, FIGS. 7 and 8 are for illustration purposes only, and it should be understood, that the placement of the antenna 27 may be a design parameter and that antenna 27 placement may be external to, affixed to, internal to, or coupled to the enclosure 32 of the electronic device.

In some embodiments, the BBIC 44 may include one or more processors coupled to one or more of memory and/or nonvolatile storage devices and may operate in conjunction with the memory and/or nonvolatile storage devices to perform various algorithms and/or data/signal processing. The radiohead 46 may include one or more transceiver/receiver(s) 28, a RF frontend 48, and/or a power management IC. The transceiver/receiver(s) 28 may receive one or more data and control signals and operate to generate a signal for transmission from the device or receive a communication signal and transmit the results to the BBIC 44. The RF frontend 48 may operate to, for example, convert a signal into a format for transmission via the antenna(s) 27 and/or convert a signal received from the antenna(s) 27 into a format for transmission to the transceiver/receiver(s) 28. The power management IC may be used to regulate and/or amplify the RF signals transmitted or received via the antenna(s) 27 and/or to supply current to the other radiohead 46 components (e.g., the transceiver/receiver(s) 28, the RF frontend 48).

The radiohead 46 may be capable of any of the above described suitable wireless communication protocols or a combination thereof. For example, if more than one radiohead 46 is used in a single electronic device 10, each of the radioheads 46 may be the same (e.g., to generate and transmit signals on a common frequency band) or different (e.g., to generate and transmit signals on differing frequency bands). In some embodiments, transmission of a signal from the electronic device 10 may be based upon signals sent from the BBIC 44 via one or more routing lines to the transceiver/receiver 28 of the radiohead 46. These routing lines may include designated or shared lines for control, data, clock, or other appropriate signals to the radiohead 46. Control and clock signals may facilitate transmission and/or reception of wireless signals by the radiohead 46 (e.g., control the operation and timing of the radiohead 46) while the data signals may include information to be transmitted from the electronic device 10 or received at the electronic device 10. In a transmission mode, data may be transmitted from the transceiver/receiver 28 to the RF front end 48, which may translate the signals (e.g., may apply digital to analog conversion of the data signals). Additionally, the data signals may be routed through the power management IC to amplify the data signals prior to their transmission. From the RF front end 48 and/or the power management IC, the data signals are carried along transmission lines 50 to the antenna(s) 27 and wirelessly transmitted therefrom. In a reception mode, the reverse process may occur.

For example, when the electronic device 10 is receiving communications, a signal may be received by the antenna(s) 27 and travel down transmission lines 50 to the radiohead 46. The RF front end 48 in the radiohead 46 may convert the received (e.g., analog) signal to a digital signal and send the digital signal to the BBIC 44 via the transceiver/receiver 28 and routing lines. The BBIC 44 may further interpret the received data signal and/or pass the data onto additional circuitry of the electronic device 10. As would be appreciated by one skilled in the art, the RF front end 48 and the power management IC may be incorporated as a single IC, as shown in FIG. 7, or may be physically separate components. Additionally, the transceiver/receiver 28, RF front end 48, and/or power management IC may all be combined in a single chip.

In general, routing lines between the BBIC 44 and the radiohead 46 may include of multiple metal wires (e.g., solid wire, stranded wire, ribbon cable, or other suitable metal medium), and, accordingly, may produce unwanted electromagnetic interference as signals are transmitted across the routing lines. The digital clock signal, for example, having a relatively fast and possibly constant frequency, represents a significant source of electromagnetic interference to other subsystems in the electronic device 10 when transmitted over a metal wire. Likewise, data lines of the routing lines may transmit a large volume of information relative to, for example, control lines of the routing lines and therefore, may also generate a significant source of electromagnetic interference. In an attempt to minimize this interference, the routing lines have been kept short by placing the radiohead 46 in close proximity to the BBIC 44, but the metal routing lines still produce electromagnetic interference.

As depicted in FIG. 7, in one embodiment, to alleviate the electromagnetic interference caused by the use of metallic routing lines, fiber optic connections may be used in place of metal connections to create the routing lines. In general, fiber optic connections have much higher bandwidth than metal wires, and therefore a single fiber optic routing line 52 may replace multiple metal routing lines. Utilizing a fiber optic routing line 52 may also save space on a printed circuit board (PCB) by reducing the footprint associated with metallic routing lines. Additionally, the fiber optic routing line 52 may generate very little, if any, electromagnetic interference, as compared to the metal routing lines. Replacement of the metallic connections at the BBIC 44 and the radiohead 46 may also be undertaken.

For example, in some embodiments, optical interfaces may be utilized in place of metal inputs (e.g., pins, pads, and the like). These optical interfaces may be located on-chip and may include, for example, optical field programmable gate arrays (FPGAs), a diamond micro interface (DMI), or other suitable optical interfaces. Using such on-chip methods, the optical interfaces and/or controllers may be integrated directly onto the BBIC 44 and radiohead 46 (e.g., the transceiver/receiver(s) 28) or may be coupled externally to the BBIC 44 and radiohead 46.

Additionally, the fiber optic routing line 52 may be used alone or in conjunction with traditional metal routing lines. For example, the fiber optic routing line 52 may be used in conjunction with a single or two-wire control line 54, whereby the fiber optic routing line 52 transmits data or data and clock signals. In this embodiment, the control line 54 carries control signals instead of data signals to minimize traffic, and thus minimize electromagnetic interference, while the fiber optic routing line 52 carries data signals between the BBIC 44 and the radiohead 46. In another embodiment, a multimode optical fiber (e.g., multimode plastic optical fiber (POF)) may be utilized to allow separate modes for data and control signal transmission, which may allow for the removal of the control line 54.

By employing a fiber optic routing line 52, electromagnetic interference to and from other circuitry within the electronic device 10 (e.g., processor 12, memory 14, storage 16, etc.) may be reduced. Additionally, the use of a fiber optic routing line 52 may allow the repositioning of the radiohead 46. Generally, the radiohead 46 is located in close proximity to the BBIC 44 to reduce the electromagnetic interference associated with the traditional metal routing lines by shortening (e.g., reducing) the physical length of the metal routing lines. By utilizing a fiber optic routing line 52, the radiohead 46 may be relocated to a position in close proximity to the antenna 27. This may provide an advantage of signals transmitted from the RF front end 48 having a shorter path to their respective antenna 27 prior to transmission, thus decreasing degradation of the RF front end 48 generated signal prior to its transmission.

FIG. 8 illustrates an electronic device 10 with radioheads 46 located millimeters (mm), as opposed to centimeters (cm), from the antennas 27. In one embodiment, the radiohead 46 may be located proximate to the outer edge of the enclosure 32, such that the transmission lines 50 from the radiohead(s) 46 to the antenna(s) 27 are less than or equal to approximately 25 mm, 10 mm, or 5 mm in length. The close proximity of the radioheads 46 and the antennas 27 allows for significantly shortened transmission lines 50. Shorter transmission lines 50 may lead to performance efficiency improvements such as decreased current drain and increased reception sensitivity as well as decreased cost associated with long RF cables (e.g., coax). Additionally, the shorter transmission lines 50 may have a lower susceptibility to electromagnetic interference from other circuitry 56, and, in turn, produce less electromagnetic interference to affect other circuitry of the electronic device 10.

In order to maintain two antennas 27 on opposing sides of the enclosure 32, while also keeping the transmission lines 50 relatively short, the embodiment of FIG. 8 includes two radioheads 46. However, it should be understood that additional antennas 27 may be employed and arranged at different positions about the enclosure 32, each with their own respective radiohead 46. Each of the illustrated radioheads 46 may be connected to the BBIC 44 via separate fiber optic routing lines 52 or may utilize a common fiber optic routing line 52, thus requiring just one optical controller on the BBIC 44. In some embodiments, if a common fiber optic routing line 52 is utilized, a fiber optic splitter or junction may be employed either at the BBIC 44, a radiohead 46, or elsewhere in the electronic device 10. As stated above, the radioheads 46 may be of the same variety, or geared toward different frequency bands and/or communication protocols.

The use of multiple radioheads 46, either using a common fiber optic routing line 52 or separate fiber optic routing lines 52, may be controlled by one or more control lines 54 connected to the BBIC 44. In both cases, the control lines 54 may carry control signals, that may, for example, indicate which radiohead 46 is to transmit/receive which RF signals. Other control signals may be transmitted to synchronize data transmission/reception between multiple radioheads 46 and/or transmit/receive different RF signals on the separate radioheads 46 simultaneously. Furthermore, as shown in FIG. 8, the control lines 54 to each of the radioheads 46 may be grouped together as a control bus. Additionally, as stated above, a multimode fiber optic (e.g., a plastic optical fiber (POF)) may be employed to transfer both data and control signals without the use of traditional metal routing lines or any separate control line 54.

The radiohead(s) 46 may be physically closer to the antenna(s) 27 than the BBIC 44 and/or may be positioned such that at least one of the transmission lines 50 is shorter than the respective fiber optic routing line 52. In some embodiments, the radiohead(s) 46 may be located at a position that is approximately, for example, 75%, 85%, or 95% of the total distance from the BBIC 44 to the antenna(s) 27. Furthermore, the radiohead(s) 46 may be located within approximately, for example, 0.1 in, 0.5 in, 1 in, 2 in, or 5 in of their respective antenna(s). As explained above, employing one or more radioheads 46 in such locations, shortening the transmission lines 50, and utilizing fiber optic routing lines 52 may help increase transmission and/or reception performance, decrease current draw, and reduce the electromagnetic interference to and from other circuitry 56 within or in close proximity to the electronic device 10.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A portable electronic device, comprising:
   a cellular telephone, a tablet, a wearable electronic device, or a notebook computer;
   processing circuitry disposed within the portable electronic device and configured to generate first radio data signals and second radio data signals;
   a first radiohead disposed within the portable electronic device and configured to generate first radio frequency (RF) signals at a first radio frequency based at least in part on the first radio data signals;
   a second radiohead disposed within the portable electronic device and configured to generate second RF signals at a second radio frequency based at least in part on the second radio data signals;
   a first optical path coupled between the first radiohead and the processing circuitry configured to communicate the first radio data signals from the processing circuitry to the first radiohead; and
   a second optical path coupled between the second radiohead and the processing circuitry and configured to communicate the second radio data signals from the processing circuitry to the second radiohead.

2. The portable electronic device of claim 1, wherein the processing circuitry is configured to generate radio control signals, and wherein the first radiohead is configured to operate based at least in part on the radio control signals.

3. The portable electronic device of claim 2, wherein the first optical path is configured to communicate the radio control signals from the processing circuitry to the first radiohead.

4. The portable electronic device of claim 2, comprising a control line, separate from the first optical path, configured to communicate the radio control signals from the processing circuitry to the first radiohead.

5. The portable electronic device of claim 4, wherein the control line comprises a metallic conductor.

6. The portable electronic device of claim 1, wherein the first radiohead comprises amplification circuitry configured to amplify the first RF signals for transmission.

7. The portable electronic device of claim 1, wherein the first radio data signals are representative of information to be transmitted via the first RF signals.

8. The portable electronic device of claim 1, wherein the processing circuitry comprises an integrated optical interface configured to couple to the first optical path.

9. A handheld electronic device, comprising:
   one or more processors disposed within the handheld electronic device and configured to generate first radio control signals;
   a first radiohead disposed within the handheld electronic device and configured to generate first radio frequency (RF) signals based at least in part on the first radio control signals;
   a second radiohead configured to receive second radio control signals from the one or more processors and generate second RF signals based at least in part on the second radio control signals;
   a first optical path coupled between the first radiohead and the one or more processors and configured to communicate the first radio control signals from the one or more processors to the first radiohead; and
   a second optical path coupled between the second radiohead and the one or more processors and configured to communicate the second radio control signals from the one or more processors to the second radiohead, wherein the first radiohead is configured to generate the first RF signals at a first radio frequency and the second radiohead is configured to generate the second RF signals at a second radio frequency.

10. The handheld electronic device of claim 9, wherein the one or more processors are configured to generate radio data signals, and wherein the first radiohead is configured to generate the first RF signals based at least in part on the radio data signals.

11. The handheld electronic device of claim 9, comprising an antenna coupled to the first radiohead and configured to transmit the first RF signals.

12. The handheld electronic device of claim 11, wherein the antenna is disposed 25 millimeters or less from the first radiohead.

13. The handheld electronic device of claim 9, wherein the first optical path comprises a single mode fiber optic cable.

14. A method, comprising:
generating, via one or more processors of a portable electronic device, first data signals associated with a first radio frequency (RF) signal, first control signals associated with the first RF signal, or both;
communicating, via a first optical path within the portable electronic device, the first data signals, the first control signals, or both from the one or more processors to a first radiohead of the portable electronic device;
communicating, via a second optical path within the portable electronic device, second data signals, second control signals, or both from the one or more processors to a second radiohead of the portable electronic device, wherein the first radiohead is configured to generate the first RF signal at a first radio frequency and the second radiohead is configured to generate a second RF signal at a second radio frequency; and
transmitting, via one or more antennas coupled to the first radiohead, the first RF signal.

15. The method of claim 14, comprising receiving, via the one or more antennas, a third RF signal at the first radiohead and communicating third data signals, based at least in part on the third RF signal, from the first radiohead to the one or more processors via the first optical path.

16. The portable electronic device of claim 1, wherein the first radio data signals comprise communication data to be transmitted from the portable electronic device via the first RF signals, radio control signals that facilitate operation of the first radiohead, or both.

17. The handheld electronic device of claim 9, wherein the one or more processors comprise a baseband integrated circuit.

18. The method of claim 14, wherein the portable electronic device comprises a cellular telephone, a tablet, a wearable electronic device, or a notebook computer.

19. The handheld electronic device of claim 9, wherein the first radio control signals comprise a clock signal.

20. The method of claim 14, wherein the one or more processors comprise a baseband integrated circuit.

* * * * *